Figure 1:
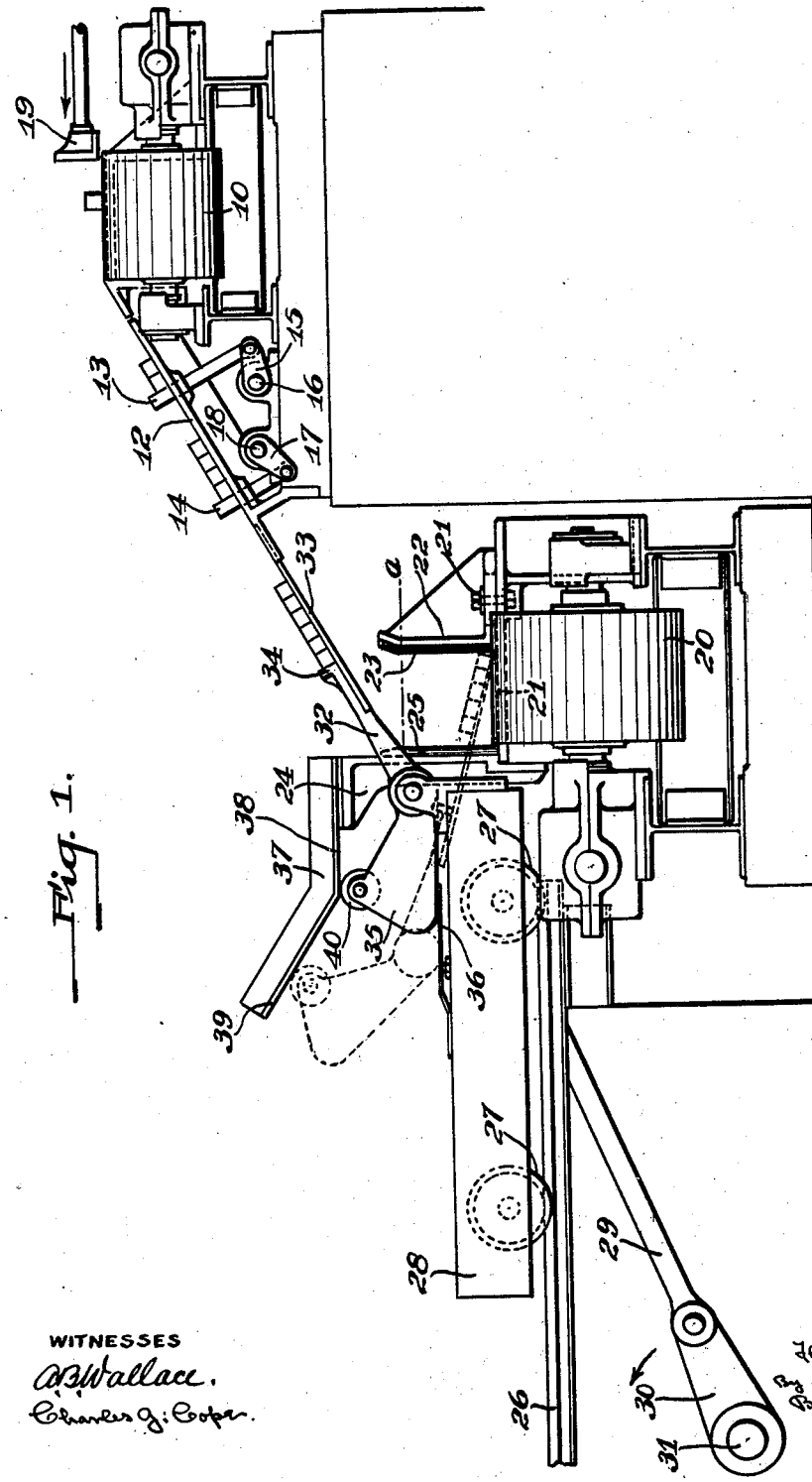

Dec. 22, 1931.  F. C. BIGGERT, JR  1,837,607
TRANSFERRING DEVICE
Filed Jan. 4, 1930   2 Sheets-Sheet 1

WITNESSES
AB Wallace.
Charles J. Cooper.

INVENTOR
Florence C. Biggert Jr
By Brown + Critchlow
attys.

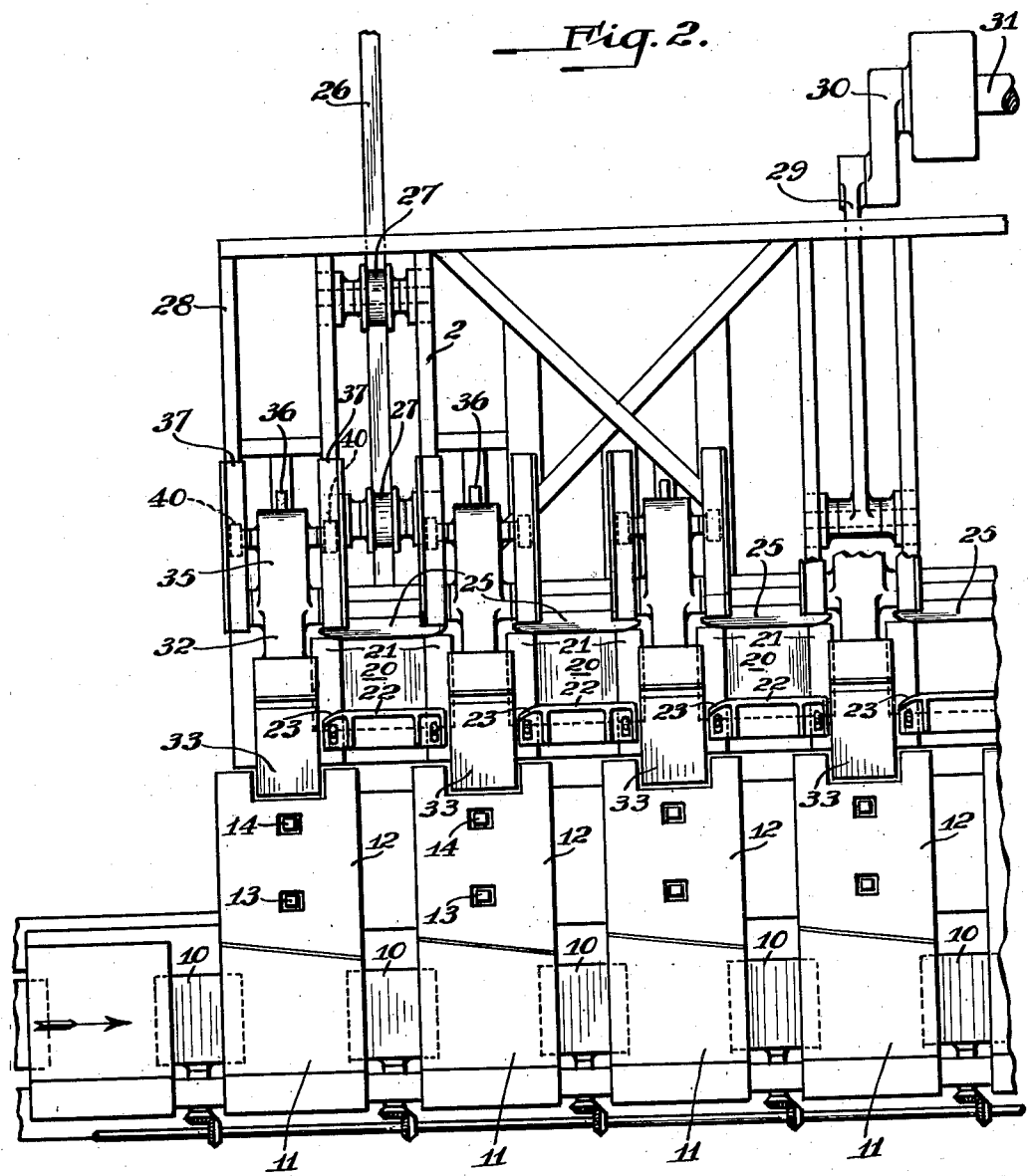

Patented Dec. 22, 1931

1,837,607

UNITED STATES PATENT OFFICE

FLORENCE C. BIGGERT, JR., OF CRAFTON, PENNSYLVANIA, ASSIGNOR TO UNITED ENGINEERING & FOUNDRY COMPANY, OF PITTSBURGH, PENNSYLVANIA, A CORPORATION OF PENNSYLVANIA

TRANSFERRING DEVICE

Application filed January 4, 1930. Serial No. 418,505.

My invention pertains to transferring devices, and relates especially to devices for transferring articles, several at a time, to a receiving member and stacking them in tiers thereon. One useful application of my invention is in the piling of billets or the like, for instance as they emerge on the run-out table of a rolling mill.

It is one object of my invention to provide a device for transferring articles several at a time which will be of a simple, economical and rugged construction, easily manipulated, and certain and rapid in its operation. Another object is to provide such a transfer device which will perform its functions regardless of variations in the height of the surface to and upon which the articles are to be transferred, whereby successive transferring operations result in the stacking of such articles in tiers. Other objects of the invention will appear from the following specification and claims.

By way of example, a material transferring device,—taking, in this instance, the form of a billet piler,—constructed in accordance with my invention is described in the following specification and shown in the accompanying drawings. However, I wish it understood that the invention may be embodied in other constructions and applied in other ways without exceeding the scope thereof as defined in the appended claims.

In the drawings, Fig. 1 is an end elevation of the billet piler, and Fig. 2 is a fragmentary view showing one end thereof in plan. Referring now to such drawings, 10 indicates the rolls of the run-out table of a rolling mill, upon which billets emerge one at a time, in the direction indicated by the arrows shown in Fig. 2, and are brought to rest, for instance by endwise engagement against a suitable stop or the like. Between the rolls 10, and slightly below the level of the same, are disposed horizontal aprons 11, and these aprons connect with inclined skids 12.

Through each of the skids extends an upper stop 13 and a lower stop 14, the lower stop being spaced from the upper stop by a distance which is at least as great as the widest pile that will be required to be made. The series of upper stops 13 are connected to cranks 15 on a shaft 16, and the lower stops are connected to cranks 17 on a shaft 18. The shafts 16 and 18 are operated by suitable power means which are manually controlled so that either the series of stops 13 or the series of stops 14 can be depressed at will. A pushing device 19 of any desired construction is provided for pushing the billets off the rolls 10 and onto the upper parts of the skids 12, whereupon the billets slide down such skids and come to rest against the upper stops 13. When a sufficient number of billets have arrived against the upper stops 13 to make up a layer as wide as the desired width of the pile, the operator actuates the shaft 16 to depress the stops 13, whereupon the batch of billets slides further down the skids 12 and comes to rest against the lower stops 14, ready to be taken away by the transfer spoons of the piler.

The piler table comprises a series of rolls 20 which are normally stationary, suitable means being provided for rotating them when it is desired to discharge the completed pile of billets which have been transferred thereto. Disposed between the rolls 20, and fixedly mounted on the framework which supports such rolls, are a plurality of aprons 21 which support a series of spaced side guides 22, these being adjustable laterally of the rolls 20, as, for instance, by securing them to the aprons by means of screws or the like passing through slots in the side guides. The side guides are beveled at their leading ends, as indicated at 23, so as to avoid the presence of corners in the path of any billet ends which may project laterally somewhat from the pile, as, for example, when short billets are being piled. Secured to the supporting frame for the rolls 20 are a series of spaced standards 24 to which are applied a second set of side guides 25. These are disposed opposite the adjustable guides 22, and both sets of guides are of a height sufficient to accommodate the highest pile which it is desired to make by transferring successive layers of billets, one layer on top of the other, from the skids 12 to the piler rolls 20.

The framework of the machine is provided with a plurality of rails 26 upon which are adapted to run the wheels 27 of a large carriage 28 which extends substantially the entire length of the machine. The carriage is adapted to be given a complete backward and return reciprocation, when desired, by means of a plurality of connecting rods 29, one of which is shown at the right of Fig. 2, these connecting rods being pivoted between the carriage and the crank pins of cranks 30 on a shaft 31. When it is desired to transfer a layer of billets from the skids 12 to the piler rolls 20, the operator, by manipulating a limit switch or the like, causes the shaft 31 to turn through one revolution, which causes the carriage 28 to roll backward on the rails 26 and then return to its original position.

Pivoted upon the carriage 28, one opposite each skid 12, and arranged so as to extend between each pair of side guides 22, 25, are a series of spoons 32, each of which is provided with a blade 33 disposed and arranged to enter a notch in the corresponding skid. The spoons are formed with ledges 34 against which the billets are adapted to strike. Each spoon is further formed with a rearwardly extending counterweight arm 35 of such mass as to overbalance the spoon when the latter is empty but to be overbalanced by the spoon when the latter has upon it the smallest weight which it will be required to carry. An adjustable abutment member 36 mounted on the carriage 28, is provided for engagement by the counterweight arm 35 of each spoon. These abutment members are so adjusted that when they are engaged by the counterweight arms the ends of the blades 33 of the spoons will lie in the notches of the skids 12 and be on substantially the same level as such skids.

Secured to the standards 24 are cam members 37 having horizontal portions 38 and upwardly and rearwardly inclined portions 39. These cam members are adapted to be engaged by rolls 40 which extend laterally from the counter-weight arms 35, the horizontal portions 37 being so disposed as to maintain the spoons in their highest positions, in which the counterweight arms engage against the abutments 36, when the carriage 28 is in its extreme forward position. Thus, when billets are supplied to the spoons, the latter are prevented from immediately descending, because of the weight of such billets, by the engagement of the rolls 40 against the horizontal portions 38 of the cam members. When, however, the carriage 28 is moved rearwardly, the rolls 40 run up the inclined portions 29, thereby allowing the spoons to swing gradually downward.

The operation of the device is as follows: The side guides 22 are adjusted so as to be separated from the side guides 25 by a distance which is somewhat greater than the width of the pile which is to be formed. Supposing that the whole machine is empty, the operator continues to actuate the pusher 19, as the billets emerge upon the run-out table, until the number of billets which is desired to make up one layer of the pile, say six billets, have accumulated on the skids 12 against the lower stops 14. Thereupon the operator raises the upper stops 13, to allow the billets thereafter to accumulate against them, and give time for the transfer from the skids 12 to the piler rolls 20 to be made. To effect the transfer, the operator first depresses the lower stops 14, whereupon the batch of billets slides down from the skids onto the blades 33 of the spoons 32, coming to rest against the abutments 34. The operator then actuates a limit switch or the like to cause the crank shaft 31 to make a complete revolution. Upon the batch of billets arriving upon the spoons 32, the latter are prevented from swinging down, under the weight of the billets, which overbalances the weight of the counterweight arms 35, by the engagement of the rolls 40 with the horizontal portions 38 of the cam members 37. As, however, the carriage 28 moves to the left (Fig. 1) the rolls 40 ride up the inclined portions 39 of the cam members, allowing the spoons to swing gradually down about their pivots, the inclined portions 39 of the cam members being so disposed that the billets carried by the spoons will not collide with the side guides 22. The billets will, however, engage the side guides 25 during the latter part of the transfer, the only result, however, being that the billets are held against further transverse movement, the blades 33 of the spoons sliding transversely of the machine beneath them. By the time the spoons have reached the position indicated in dotted lines in Fig. 1, which will occur when the cranks 30 have made about a one-fourth revolution, the ends of the spoon blades 33 will have come close to, or in engagement with, the aprons 21. During the remainder of the movement of the carriage 28 to the left the blades 33 of the spoons will be withdrawn from beneath the billets, which latter are retained by the engagement with the guides 25 and fall successively onto the piler rolls 20, to form the bottom layer of the pile. When the ends of the blades 33 have passed from beneath the billets, the spoons, being now empty and overbalanced by the counterweight arms 35, will swing up again until the counterweight arms 35 strike the abutments 36, the position being the same as that shown in Fig. 1, except that the carriage 28, and the spoons supported thereby, are moved to the left. Upon the return of the carriage, the blades 33 of the spoons will enter the notches of the skids 12, ready to receive another batch of billets. The next transferring operation will be the same as that just described except that there will now be a layer of billets on the piler rolls 20. The descent, therefore, of the spoons 32 will be arrested by the engagement of the ends of the blades 33 with this layer of billets, and the rolls 40 will leave the inclined portions 39 of the cam members 37 somewhat before the end of their movement therealong. The operations are continued until the pile of billets has reached some such level as is indicated by the broken line a, whereupon the piler rolls 20 are set in motion to discharge the whole pile of billets, which are in a neatly stacked condition, convenient for storage or for transfer to other apparatus in which it may be required that they be worked.

The device of my invention provides a rapid and convenient means for collecting articles and transferring them in batches from one station to another. Its further function of delivering the articles in the form of a neat and compact pile is especially advantageous. For example, it effects a material improvement in the handling of billets in rolling mill practice, where it has been common to deliver the billets in irregular heaps, requiring to be bundled before being seized by a crane, to be rearranged before being stacked in a storage pile, etc.

I claim:

1. In an apparatus for transferring articles, in combination, a delivery support, a receiving support disposed in a plane beneath that of said delivery support and also spaced laterally from said delivery support, a laterally movable carriage, a transfer member mounted for substantially vertical movement with respect to said carriage so as to be movable substantially vertically from the level of said delivery support towards the level of said receiving support, means tending to move said transfer member upward, said means being adapted to be overcome by the weight of the articles being transferred, whereby said transfer member descends upon the application of the articles thereto, means for moving said carriage laterally through a distance equal to that which laterally separates said supports and a sufficient additional distance to permit said transfer member to pass from beneath the articles transferred, and means for controlling the vertical movement of said transfer member during lateral movement of said carriage to cause said transfer member to lower the articles towards said receiving table.

2. A device for transferring articles from a delivery to a receiving support comprising a carriage arranged for lateral movement with respect to said receiving support, a transfer member pivoted to said carriage, for substantially vertical movement, whereby said transfer member will swing downward under the weight of articles applied thereto, means for moving said carriage to cause said transfer member to move laterally from said delivery to said receiving support and then beyond the latter, and a cam device for controlling downward swinging of said transfer member during movement to said receiving support, whereby said transfer member deposits the articles on said receiving support, and swings upward after passing from beneath the deposited articles.

3. A device for transferring articles from a delivery to a receiving support comprising a movable carriage, a transfer member associated with said carriage for substantially vertical movement with respect thereto, means tending to maintain said transfer member in an upper position, said means being adapted to be overcome by the weight of the articles to be transferred, means for controlling the movement of said transfer member with respect to said carriage during lateral movement of the latter to cause said transfer member to descend during such movement, and means for moving said carriage to cause said transfer member to transfer articles from said delivery to said receiving support.

4. A device for transferring articles from a delivery to a receiving support comprising a movable carriage, a transfer member associated with said carriage for substantially vertical movement with respect thereto, means tending to maintain said transfer member in an upper position, said means being adapted to be overcome by the weight of the articles to be transferred, means for controlling the movement of said transfer member with respect to said carriage during lateral movement of the latter to cause said transfer member to descend during such movement, and means for moving said carriage to cause said transfer member first to transfer the articles from said delivery to said receiving support and then to move from beneath the articles transferred.

5. A device for transferring articles from a delivery to a receiving support comprising a movable carriage, a transfer member associated with said carriage for substantially vertical movement with respect thereto, means tending to maintain said transfer member in an upper position, said means being adapted to be overcome by the weight of the articles to be transferred, a cam member associated with said transfer member for controlling the movement of the latter to cause it to descend towards said receiving support during movement of said carriage, and means for moving said carriage to cause said transfer member to transfer articles from said delivery to said receiving support.

6. A device for transferring articles from a delivery to a receiving support comprising a movable carriage, a transfer member pivotally associated therewith for substantially vertical movement, means tending to swing said transfer member upward, said means being adapted to be overcome by the weight of the articles to be transferred, a cam device associated with said transfer member for controlling the movement of the latter to cause it to descend towards said receiving support during movement of said carriage, and means for moving said carriage to cause said transfer member first to transfer the articles and subsequently to move from beneath the latter.

7. A device for transferring articles from a delivery to a receiving support comprising a movable carriage, a transfer member pivoted thereto for substantially vertical movement and adapted to receive the articles thereon, means tending to swing said transfer member upwardly about its pivot, said means being adapted to be overcome by the weight of the articles to be transferred, a fixed cam adapted to be engaged by said transfer member for controlling the movement of the latter to cause it to descend towards said receiving support during movement of said carriage, and means for moving said carriage to cause said transfer member first to transfer the articles and then to move from beneath the latter.

8. A device for transferring articles from a delivery to a receiving support, comprising a movable carriage, a transfer member associated therewith for substantially vertical movement with respect thereto, means tending to move said transfer member upwardly, said means being adapted to be overcome by the weight of the articles to be transferred, a stop on said carriage adapted to be engaged by said transfer member when the latter is in an upper material-receiving position, a fixed cam adapted to be engaged by said transfer member for controlling the movement of the latter to cause it to descend towards said receiving support during movement of said carriage, and means for moving said carriage to cause said transfer member first to transfer the articles and then to move from beneath the latter.

9. A device for transferring articles from a delivery to a receiving support, comprising a carriage movable laterally with respect to said receiving support, a transfer member associated with said carriage and movable substantially vertically with respect thereto to and from a position in which it is adapted to receive articles from said delivery support, means for moving said carriage to cause said transfer member to move laterally from said delivery support towards said receiving support, and means independent of said carriage for controlling vertical movement of said transfer member during such movement of said carriage.

10. A device for transferring articles from a delivery to a receiving support, comprising a carriage movable laterally with respect to said receiving support, a transfer member connected with said carriage for substantially vertical movement with respect thereto, whereby said transfer member will decend under the weight of articles applied thereto, means for maintaining said transfer member in receiving position with respect to said delivery support in one position of said carriage, means for moving said carriage to cause said transfer member to move laterally from said delivery support towards said receiving support and then to move beyond said receiving support, and means controlling the descent of said transfer member during the first part of said movement of said carriage.

11. A device for transferring articles from a delivery to a receiving support comprising, a carriage, a transfer member connected with said carriage for substantially vertical movement, whereby said transfer member will descend under the weight of articles applied thereto, said carriage being reciprocable between points in which said transfer member is in material receiving position with respect to said delivery support and is beyond said receiving support, means for maintaining said transfer member in receiving position with respect to said delivery support when said carriage is at the first-named point, and means for controlling the descent of said transfer member during movement away from said receiving support said means permitting rise of said transfer member prior to its return to said support.

12. A device for transferring articles from a delivery to a receiving support comprising a carriage, a transfer member associated with said carriage for substantially vertical movement, said carriage being reciprocable between points in which said transfer member is in material receiving position with respect to said delivery support and is beyond said receiving support, means tending to cause said transfer member to move upward, said means being adapted to be overcome by the weight of the articles to be transferred, and means for controlling the position of said transfer member during movement of said carriage to permit said transfer member to move downwardly during lateral movement away from said delivery support.

13. The combination with a receiving support and a delivery support inclined downwardly towards the same of means for transferring articles from said delivery to said receiving support comprising a carriage movable laterally of said receiving support, a transfer member pivotally associated with said carriage to swing substantially vertically between said supports, means, adapted to be overcome by the weight of the articles to be transferred, tending to swing said transfer member upward, means for moving said carriage between points where said transfer member is in receiving position with respect to said delivery support and is beyond said receiving support, and a cam device associated with said transfer member for controlling the downward movement of the latter under the weight of the articles being transferred.

In testimony whereof, I sign my name.

FLORENCE C. BIGGERT, Jr.